May 3, 1960 C. J. SMITH ET AL 2,935,150
HYDRAULIC POWER STEERING DEVICE
Filed Aug. 5, 1955 7 Sheets-Sheet 3
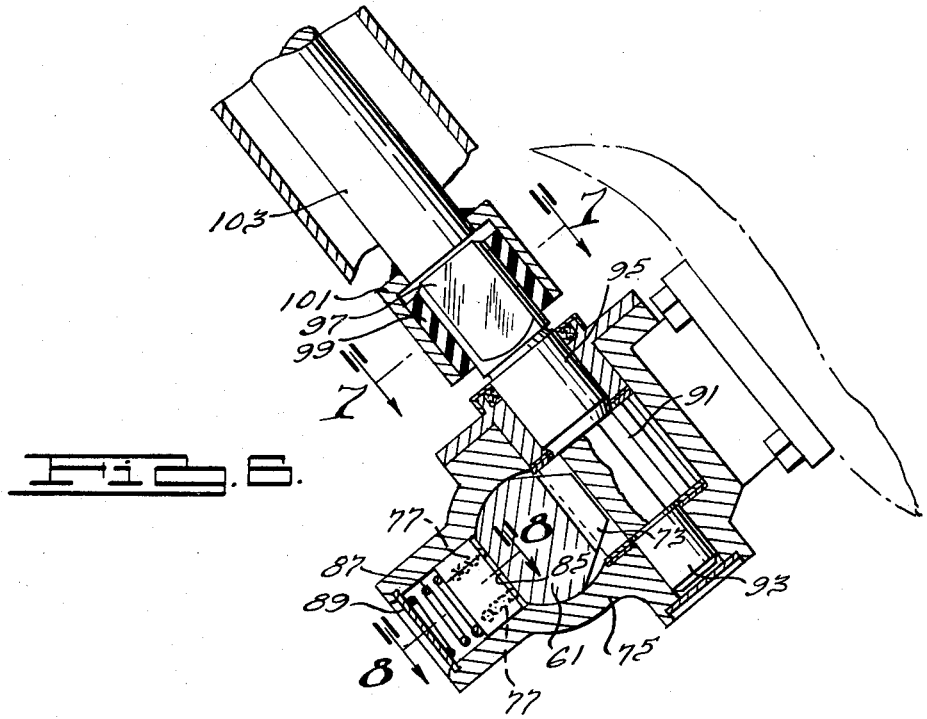
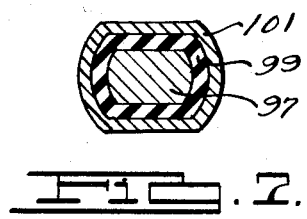
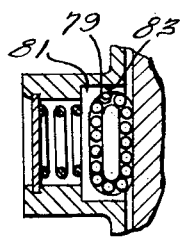
INVENTORS.
Charles J. Smith
Charles E. Read
BY Ivan N. Schatzka
Harness, Dickey & Pierce
ATTORNEYS

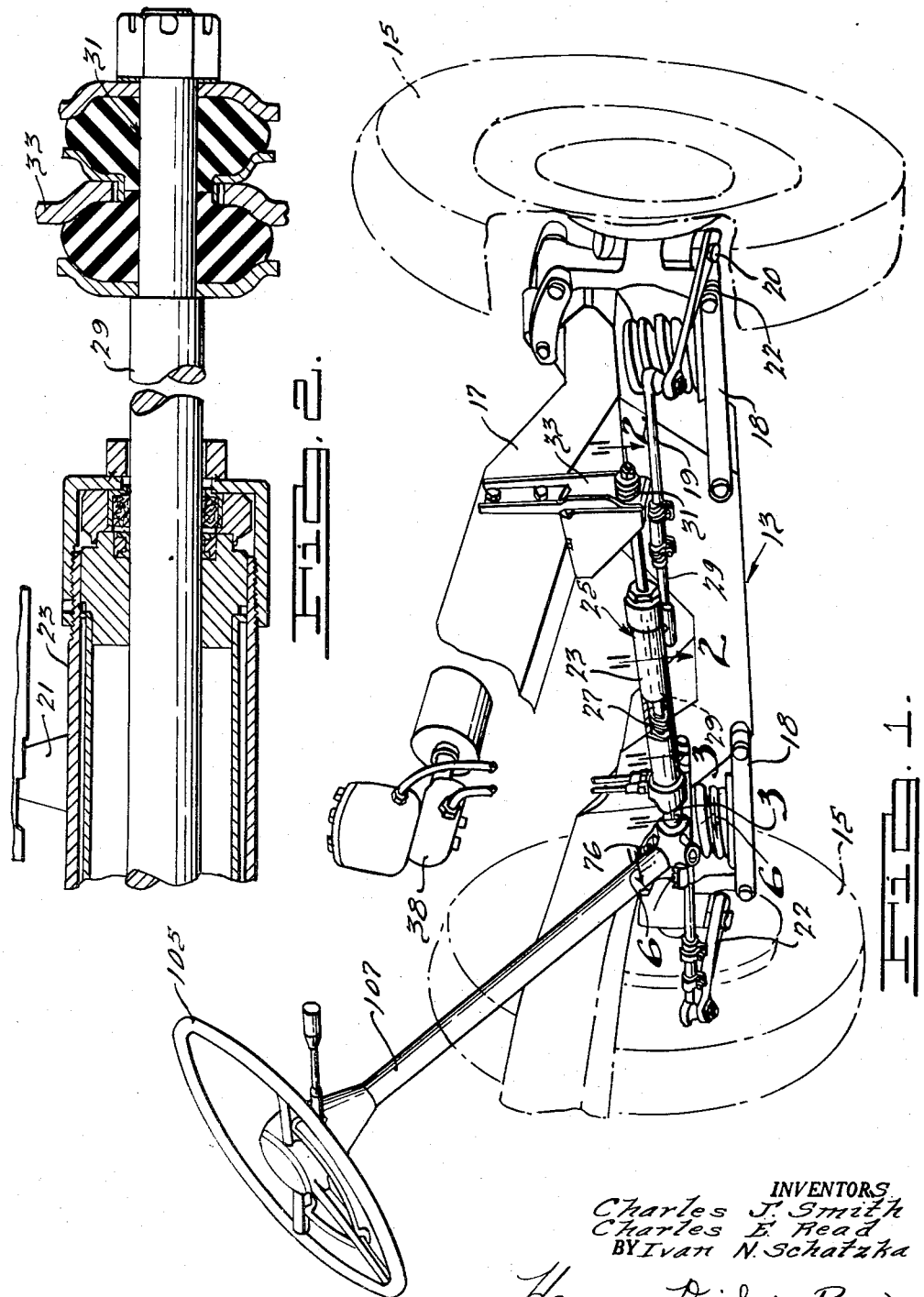

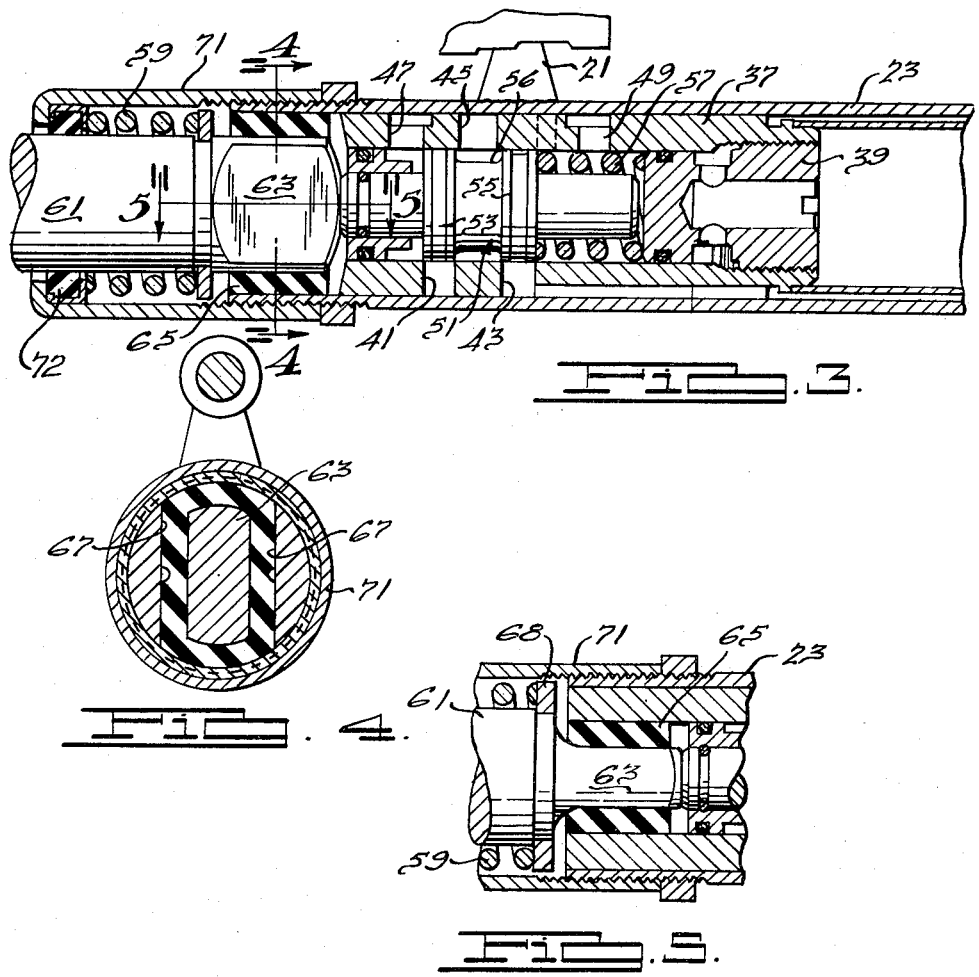

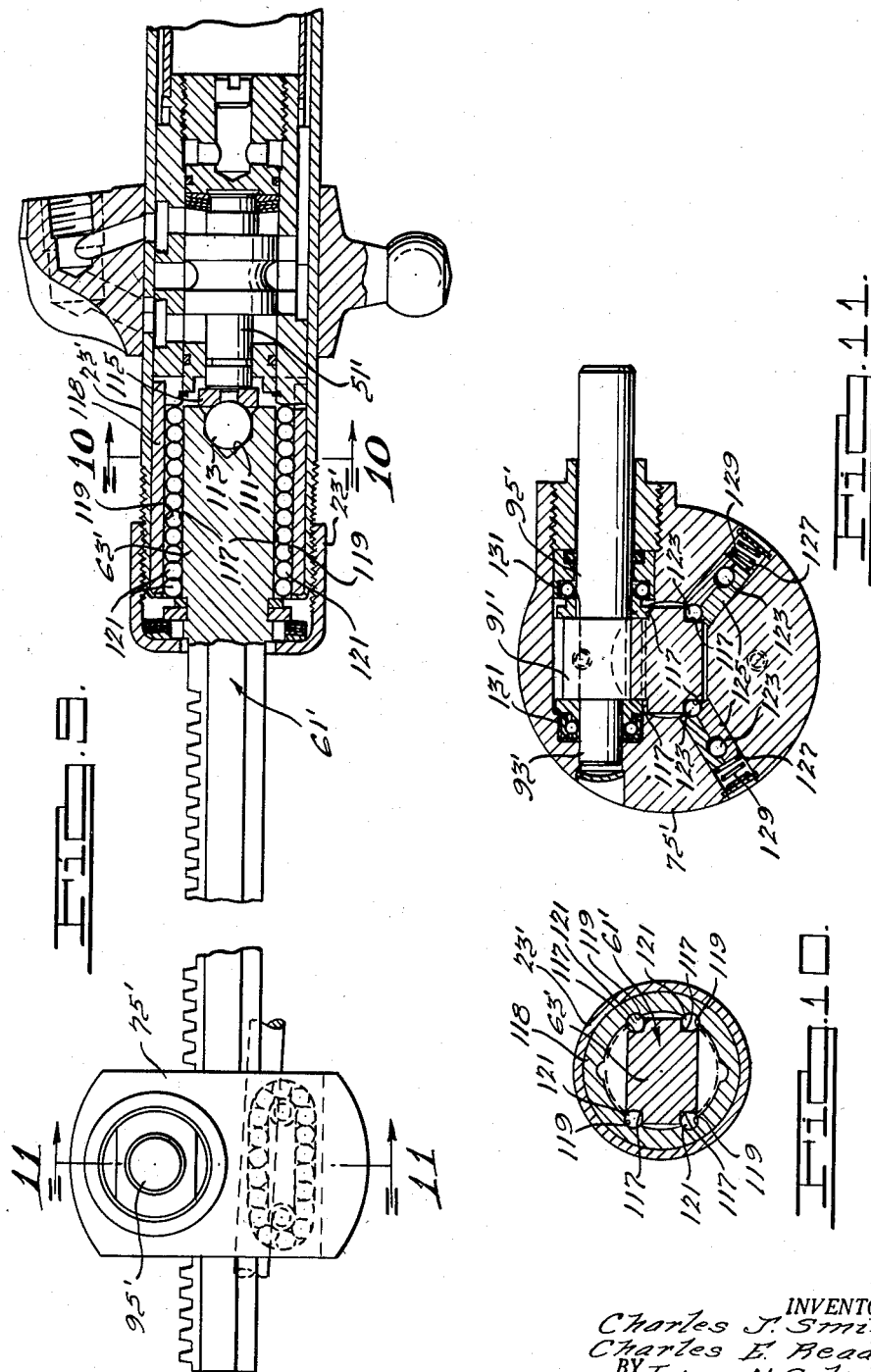

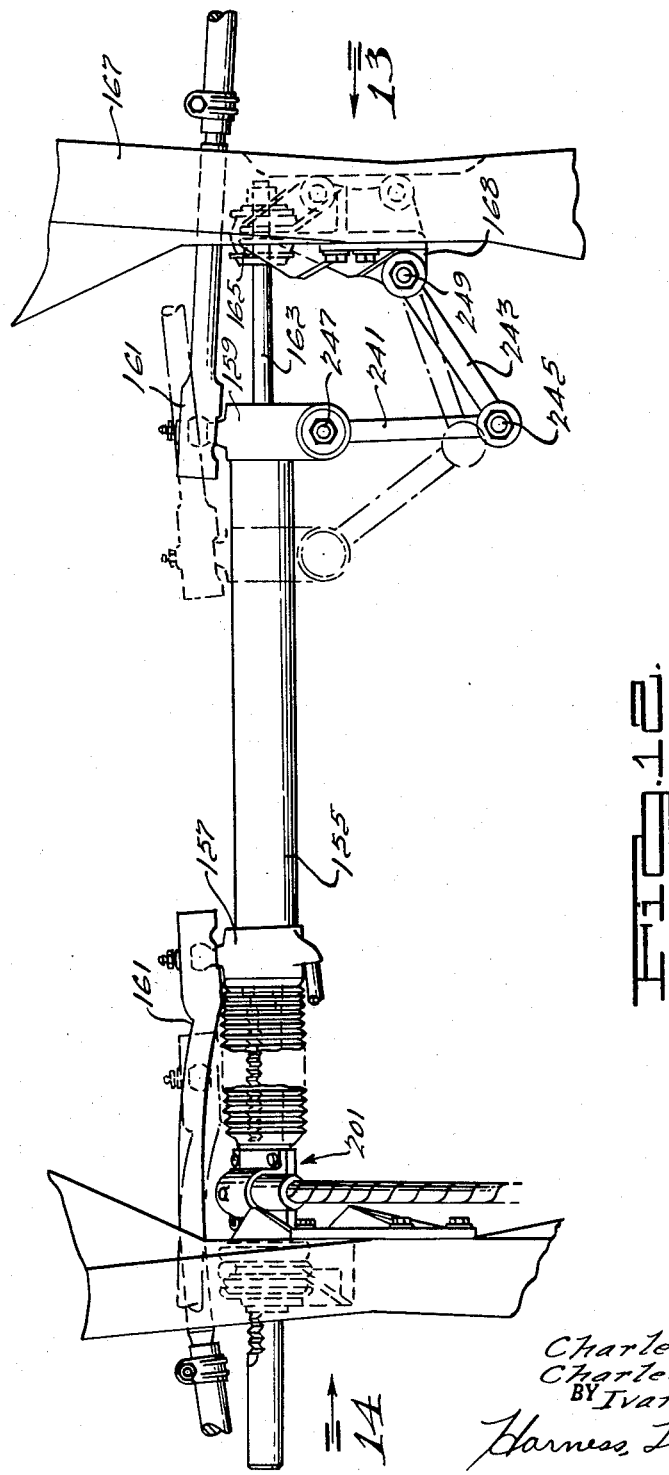

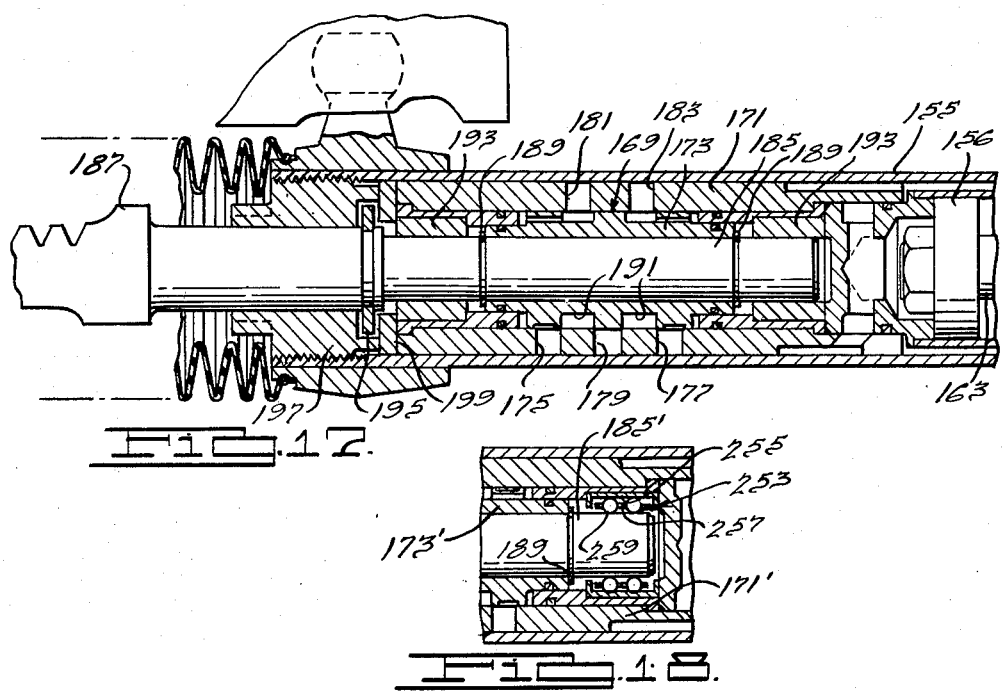
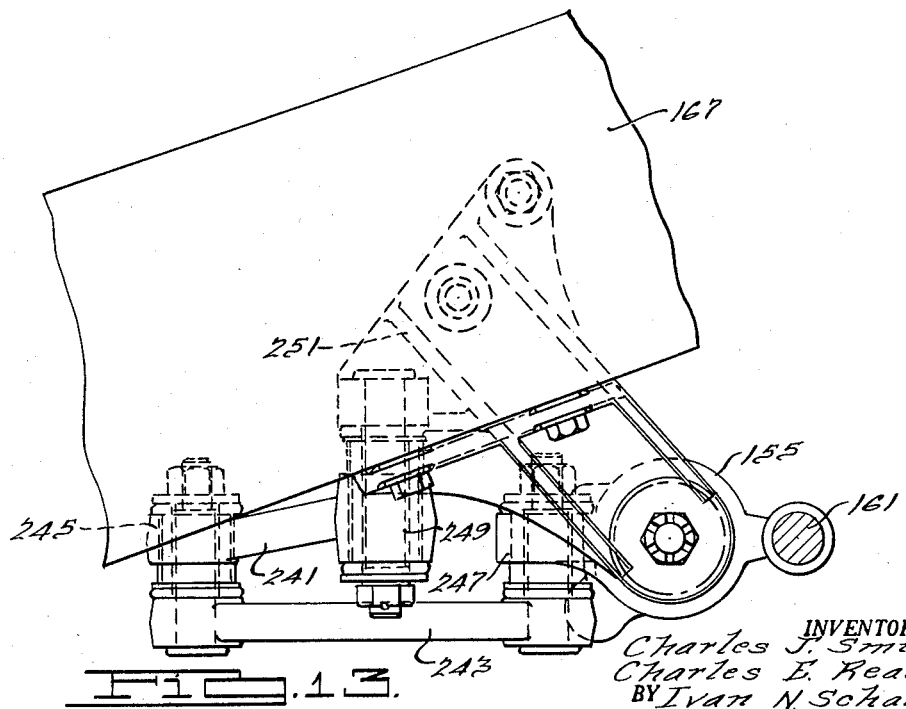

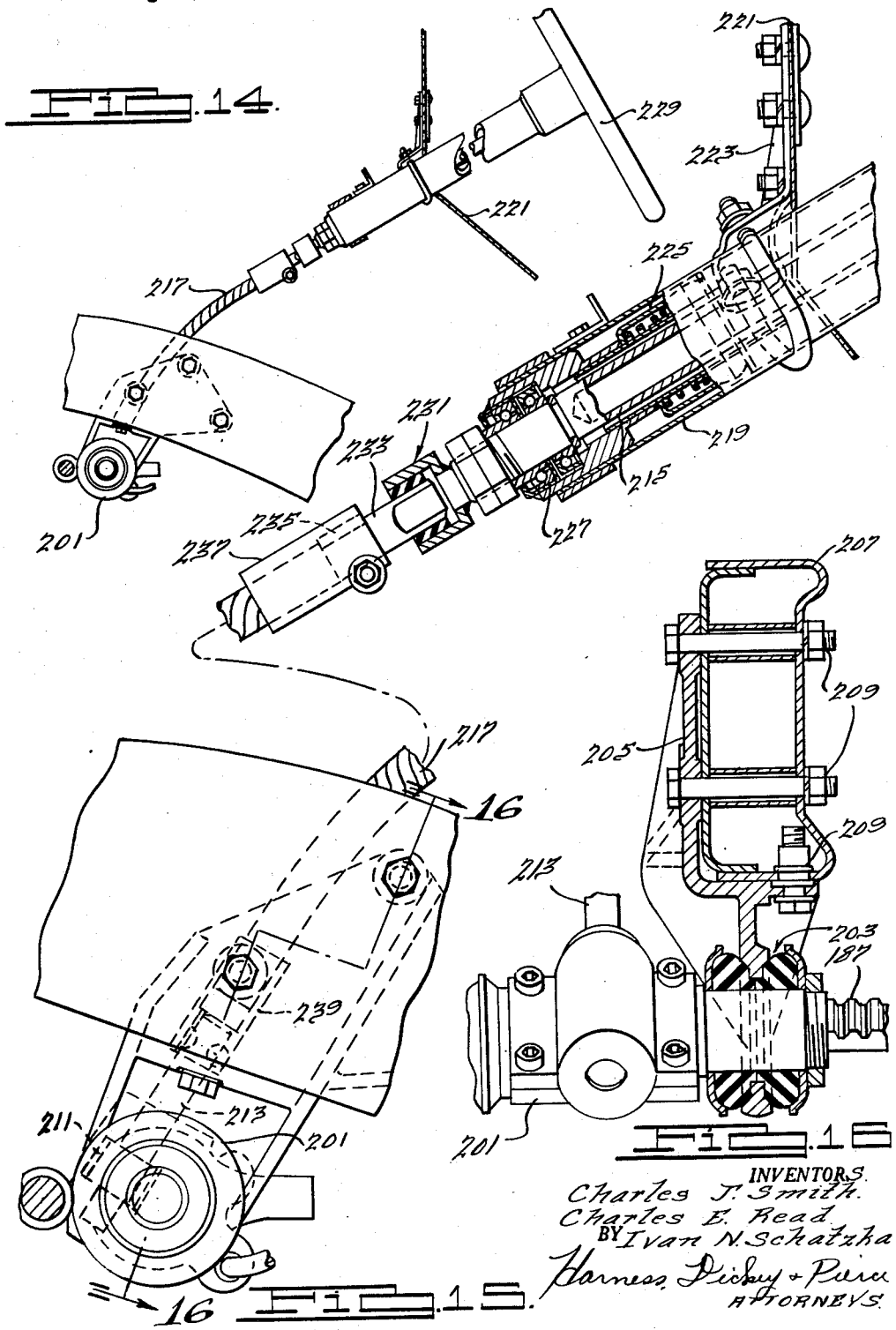

United States Patent Office 2,935,150
Patented May 3, 1960

2,935,150

HYDRAULIC POWER STEERING DEVICE

Charles J. Smith, Charles E. Read, and Ivan N. Schatzka, Monroe, Mich., assignors to Monroe Auto Equipment Company, a corporation of Michigan Application August 5, 1955, Serial No. 526,732

5 Claims. (Cl. 180—79.2)

This invention relates generally to vehicle steering systems, and more particularly to an improved power steering system.

Vehicle steering systems in use at the present time in this country employ a steering gear mechanism which may be of the worm type and which is relatively expensive to manufacture. Engineers have felt that such steering gear mechanisms are necessary in order to prevent translation of ground wheel road shock to the vehicle steering wheel. That is, while relatively inexpensive steering mechanisms, such as the rack and pinion type, were at one time used in this country and are at present used in many foreign countries, American automotive engineers have not found the same to be satisfactory or safe as they do not prevent shocks or ground wheel deflections from being transferred directly to the steering wheel as do worm type steering gear mechanisms. Applicants, however, have developed a system which includes a hydraulic power steering unit and a rack and pinion type steering gear, which system does not have the aforementioned disadvantages, and reduces the cost of manufacturing vehicles equipped with power steering units, thus making power steering on vehicles available to more people.

It is an object of this invention to provide a power steering system or arrangement for vehicles which is much less expensive than any heretofore known, but which is equally as satisfactory in operation as previous arrangements designed for use with worm type steering gears, such as illustrated in applicant's prior Patent No. 2,676,-663, issued April 27, 1954 and entitled "Power Steering Device."

It is a still further object of this invention to provide a power steering mechanism which includes a rack and pinion connection between the steering shaft and the valve of the power steering cylinder so that the cost of the vehicle power steering system is less than any heretofore known.

It is a still further object of this invention to provide a power steering system of the aforementioned type in which road shocks from the vehicle ground engaging wheels will not be transmitted back to the vehicle steering wheel, thus overcoming the common fault of rack and pinion type steering mechanisms heretofore known or used and providing a safe and durable vehicle steering arrangement.

It is a still further object of this invention to provide a power steering system of the aforementioned type in which a portion of the steering mechanism may be connected with the chassis before the vehicle body is connected to the chassis, and a portion connected with the vehicle body before assembly on the chassis, so that when the body is lowered onto the chassis during production of a vehicle, the steering portions may be thereafter interconnected thus reducing the cost of assembly of the vehicle.

It is a still further object of this invention to provide in a power steering system of the aforementioned type, a relatively simple and inexpensive power steering unit which replaces a portion of the normal steering linkage, such as the drag link or the like, and which is connected with the steering shaft through flexible means so as to permit the power steering unit to be easily connected with the remainder of the steering mechanism.

These and other objects of this invention will become apparent from the following detailed description, taken in conjunction with the accompanying drawings, in which:

Figure 1 is a fragmentary perspective view, with parts broken away in section, of a power steering device of this invention supported on the frame of an automotive vehicle and connected with the vehicle steering wheel and shaft;

Fig. 2 is an enlarged sectional view of the structure illustrated in Fig. 1, taken along the line 2—2 thereof;

Fig. 3 is an enlarged sectional view of the structure illustrated in Fig. 1, taken along the line 3—3 thereof;

Fig. 4 is a sectional view of the structure illustrated in Fig. 3, taken along the line 4—4 thereof;

Fig. 5 is a sectional view of the structure illustrated in Fig. 3, taken along the line 5—5 thereof;

Fig. 6 is an enlarged sectional view of the structure illustrated in Fig. 1, taken along the line 6—6 thereof;

Fig. 7 is a sectional view of the structure illustrated in Fig. 6, taken along the line 7—7 thereof;

Fig. 8 is a sectional view of the structure illustrated in Fig. 6, taken along the line 8—8 thereof;

Fig. 9 is a sectional view similar to Fig. 3, illustrating a further embodiment of the invention;

Fig. 10 is a sectional view of the structure illustrated in Fig. 9, taken along the line 10—10 thereof;

Fig. 11 is a sectional view of the structure illustrated in Fig. 9, taken along the line 11—11 thereof;

Fig. 12 is a fragmentary elevational view of a front portion of a vehicle illustrating a still further embodiment of the invention;

Fig. 13 is an enlarged side elevational view of the structure illustrated in Fig. 12 and taken in the direction of the arrow 13 thereon;

Fig. 14 is a reduced side elevational view of the structure illustrated in Fig. 12, taken in the direction of the arrow 14 thereon;

Fig. 15 is an enlarged view similar to Fig. 14 and partly in section and partly in elevation;

Fig. 16 is a sectional view of the structure illustrated in Fig. 15, taken along the line 16—16 thereof;

Fig. 17 is a sectional view, similar to Fig. 3, illustrating the control valve and rack portion of the device illustrated in Figs. 12 to 16; and Fig. 18 is a fragmentary sectional view showing a portion of the structure illustrated in Fig. 17, but illustrating a still different bearing arrangement for supporting the rack in the power steering cylinder.

Referring now to the drawings, and particularly to Figs. 1 to 8 inclusive, it will be seen that an automotive vehicle 13 is illustrated, which includes, in the usual manner, opposed ground engaging wheels 15 which are supported on a chassis frame 17 by suitable suspension arms or the like 18. A steering knuckle 20 is carried by each suspension arm and connected with its adjacent wheel to permit the wheel to turn about a generally vertical axis. A steering knuckle arm 22 is connected with each steering knuckle 20, and the inner end of each knuckle arm is connected with the outer end of a steering link 19. The steering links 19 have their lateral inner ends universally connected with a tubular sheet metal cylinder 23 of a power steering unit 25 through ball-type connector elements 21, or the like, projecting from and rigid with the cylinder. Disposed within the cylinder 23 is a bore-fitting piston 27 which is connected with a piston rod 29 which extends through one end of the cylinder 23 and is flexibly connected at 31 with a bracket 33 which, in turn, is rigidly connected with the frame. The piston rod projects from one end only of the cylinder and is flexibly connected with the frame so as to have limited universal movement to prevent breakage or binding of the unit during actuation of the piston and cylinder. A valve body or housing 37 is disposed in the left-hand end of the cylinder 23, as viewed in Figs. 1 and 3, and has its right-hand end closed and separated from the remainder of the cylinder by means of a plug 39. The valve housing 37 has a pair of ports 41 and 43 therein which are adapted to be connected with the cylinder 23 on opposite sides of the piston 27 by any suitable means, such as conduits or passages, which may be in the valve body and/or in the cylinder. The valve housing 37 likewise is provided with a main pressure port 45 which is adapted to be connected with a source of fluid under pressure, such as a hydraulic pump 38. The valve body likewise has a pair of reservoir or tank passages 47 and a drain passage 49 which likewise is connected with a reservoir to drain any fluid which may be disposed in the adjacent portion of the valve body. The reservoir is conventionally provided as a part of the pump assembly. A valve spool 51 is disposed within the bore of the valve body 37 and provided with a pair of longitudinally spaced lands 53 and 55 which are interconnected by means of a groove or reduced diameter portion 56 of the valve spool.

The valve spool 51 is normally retained in a neutral position by means of opposed coil springs 57 and 59, and when in its neutral position cylinder ports 41 and 43 are connected with the tank ports 47 so that the piston 27 is not being actuated by fluid pressure in the cylinder. The valve may be constructed in a suitable manner, such as illustrated and described in the aforesaid patent and further description is not thought to be necessary here. In order to actuate the valve spool 51 and thus actuate the piston 27 in one direction or another, a rack 61 is provided with extends into the left-hand end of the cylinder 23, as viewed in Figs. 1 and 3. The inner end of the rack 61 has a reduced flat end portion 63 disposed in the cylinder 23 and has a resilient collar-like member 65 sleeved thereon and engaging a flat wall portion 67 of the cylinder, so that the inner end of the rack 61 cannot rotate relative to the cylinder except within the confines of the resilient sleeve, thus providing in effect a limited universal joint between the cylinder and the rack, whereby the cylinder cannot rotate relative to the rack except through the flexibility of the resilient sleeve. The inner end 63 of the rack 61 abuts one end of the valve spool 51 and is yieldably retained in engagement therewith by means of the spring 59 which engages a washer or shoulder 68 on the rack, and by means of spring 57 which engages the opposite end of the spool. Thus, movement of the rack 61 longitudinally relative to the cylinder will cause a like movement in either direction of the valve spool to thus shift the same and direct fluid under pressure into port 41 or port 43 and thus to the cylinder 23 on either side of the piston 27 to cause the power steering effect, substantially as described in applicant's Patent No. 2,676,663, previously mentioned.

It should at this time also be noted that an end cap 71 is threadably connected to the left-hand end of the cylinder 23 and carries a suitable seal 72 which engages the periphery of the rack 61 to prevent leakage of fluid from the unit. The outer end of the rack 61 has gear teeth 73 formed thereon to provide a rack type gear. The outer end portion of the rack 61 extends into a housing 75 which, in turn, is connected with the frame 17 by any suitable means, such as a bracket or bracket portion 76. The rack 61 is movable transversely of the vehicle in the housing 75 and is movably supported in the housing by ball bearings 77 which are supported in suitable side-by-side tracks 79 in a bearing race 81 disposed in a recess 83 in the housing. The race and ball bearings are resiliently urged against a flat surface 85 on the underside of rack 61 by means of a coil spring 87, the outer end of which abuts a plate 89 suitably anchored in the housing 75. The rack teeth 73 on the rack 61 engage the teeth of a pinion gear 91 having opposed cylindrical trunnion portions 93 and 95 which are journalled in the housing 75. The outer end of the pinion gear trunnion portion 95 is flattened to provide a spade 97 over which a resilient collar-like member 99 is sleeved. The resilient collar-like member 99 is similar in shape to the collar member previously described and non-rotatably engages a complementary shaped wall or end portion 101 on the forward or lower end of a steering shaft 103. Thus, the resilient sleeve member 99 provides a flexible or limited universal connection between the pinion gear and the steering shaft, but rotation of the steering shaft will cause rotation of the pinion gear 91 which, in turn, will cause lateral movement of the rack 61 which, in turn, will cause the cylinder 23 to move laterally of the vehicle and thus turn the wheels in one direction or the other, in accordance with the direction of rotation of the steering shaft. If the force required to turn the ground engaging wheels is sufficient to move the valve spool 51 relative to the valve housing, hydraulic fluid under pressure will flow against the piston 27 to aid in this movement and thus provide the hydraulic assist for steering the ground engaging wheels 15 of the vehicle in a manner substantially the same as described in applicant's aforementioned patent.

In the assembly of a vehicle incorporating the power steering unit, the unit may be connected with the chassis frame prior to the vehicle body being placed on the chassis frame, while the steering shaft 103, the upper end of which is connected with a steering wheel 105, may be disposed in a steering shaft housing 107 in the body, and when the body is dropped onto the chassis the connection of the steering shaft with the pinion gear may be effected through the flexible joint at the lower end of the shaft, thus eliminating the cumbersome assembly problem now present in vehicles where the steering shaft must be carried by the chassis and inserted through suitable openings in the body. The unit of this invention thus also reduces the cost of vehicle assembly, as well as having the other advantages pointed out.

It will thus be appreciated that with the device of this invention a simple rack and pinion type of steering gear is employed, thus eliminating the costly steering gear now used in vehicles. The road shocks and deflections incurred by the ground engaging wheels 15 furthermore are not transmitted to the steering wheel 105 because of the hydraulic piston and cylinder unit incorporated between the ground engaging wheels and the steering wheel.

The unit illustrated in Figs. 9 through 11 is substantially the same as previously illustrated and described, except in the manner of supporting the rack in the housing and in the cylinder. In this embodiment, the inner end 63' of the rack 61' is recessed at 111 and carries a spherical ball 113 therein, which engages a ball seat member 115 which, in turn, abuts the end of the valve spool 51'. The edges of the inner end portion 63' of the rack 61' are cut back or notched at 117, and likewise the adjacent portion of a cylinder sleeve 118 is recessed at 119 to provide tracks in which a plurality of ball bearings 121 are disposed to slidably support the rack 61' for movement within the cylinder 23', while at the same time preventing relative rotation between the rack and the cylinder. The outer end of the rack 61' extends into the housing 75' and suitable ball bearings 123 are supported in races 125 for engagement with the recesses or notches 117 therein. On the underside of the rack 61' the races 125 are disposed in suitable recesses 127 in the housing and the races and balls are yieldably urged against the rack 61' by means of coil springs 129 disposed in the housing. Pinion gear 91', having trunnion portions 93' and 95' is rotatably supported in the housing 75' in engagement with the gear teeth on the rack by suitable bearings 131. The outer end of the trunnion portion 95' of the pinion gear may be suitably connected with the steering shaft through a suitable universal or flexible joint, such as previously described. Thus, in this embodiment, the rack 61' is slidably connected with both the cylinder 27' and the housing 75' and held against rotation with respect to both of these elements.

In the embodiment of the invention illustrated in Figs. 12 through 17, a laterally extending power steering cylinder 155 is provided having a pair of connector elements 157 and 159 thereon which are flexibly or universally connected to laterally extending steering links 161 in the manner previously described. The cylinder 155 contains a piston 156 to which a projecting piston rod 163 is connected, and the free end of the piston rod is flexibly connected at 165 with a portion 167 of a vehicle chassis frame through a suitable bracket 168. The cylinder contains a control valve 169 which includes a valve body or housing 171 inserted into the cylinder and a movable spool type valve element 173. Suitable means are provided for separating a portion of the cylinder containing the piston from a portion of the cylinder containing the control valve. The movable valve element 173 and the valve housing 171 are suitably apertured to control flow of fluid between a fluid pump on a vehicle and opposite sides of the piston 156. For this purpose the housing is provided with apertures 175 and 177 which are adapted to be connected with the fluid pump and with an aperture 179 which is adapted to be connected with the reservoir. Likewise, the housing is provided with apertures 181 and 183 to which conduits (not shown) are connected for communicating the control valve with the cylinder on opposite sides of the piston in substantially the same manner as described in the aforementioned patent.

The movable valve element 173 is centrally bored to receive an inner cylindrical end portion 185 of a rack member 187. The inner end portion 185 of the rack member is retained in engagement with the valve spool 173 by means of snap rings 189 so that lineal or axial movement of the rack member will cause similar movement of the movable valve spool 173 and thus shift the grooves 191 therein to communicate the pressure apertures 175 and 177 with the cylinder apertures 181 or 183 to provide fluid under pressure for shifting the cylinder 155 relative to the piston 156 and thus give power steering aid to the vehicle. The rack inner end portion 185 is slidably supported in the cylinder and control valve housing means by means of bushings 193 which support the rack adjacent opposite ends of the valve spool. With this double bushing or bearing arrangement the rack is supported at spaced intervals so that deflections thereof, which might interfere with the satisfactory operation, are reduced to a minimum. A collar-like member 195 is connected with the rack and adapted to engage at one end of the valve spool travel a closure member 197 on the outer end of the cylinder, and at the other end of the valve spool travel to engage a spacer or abutment member 199 mounted in the cylinder between the end cap 197 and the valve housing 171. Thus, as in the case of all of the embodiments of this invention, if the fluid pressure should fail, movement of the rack will, when the valve spool reaches the end of its travel, cause movement of the cylinder and thus of the steering links to manually turn the vehicle wheels just as if power steering were not provided on the vehicle.

The rack 187 extends outwardly beyond the cylinder 155 and is supported in a housing member 201. The housing member 201 is connected through a flexible connection 203 with a bracket 205 which, in turn, is rigidly connected with a portion 207 of a vehicle chassis frame by suitable bolts and nuts 209. The rack is slidably supported in the housing for movement laterally of the vehicle, and the gear teeth thereon mesh with the gear teeth on a pinion gear 211 suitably journalled in the housing 201. Means such as shims or an eccentric bearing may be provided between the housing and pinion gear to adjust the pinion gear into proper meshing relationship with the teeth on the rack member. The pinion gear 211 has a stub shaft portion 213 projecting upwardly and rearwardly beyond the confines of the housing and is connected to the steering shaft 215 of the vehicle through flexible means, such as a flexible shaft or cable 217.

As can be best seen in Figs. 14 and 15, the vehicle steering shaft housing 219 is connected to a front wall portion 221 of a vehicle body by suitable bracket means 223. The housing contains the usual gear shift mechanism 225 and the steering shaft 125 is journalled in the housing by suitable bearings 227. The steering wheel 229 is connected to the upper or rear end of the steering shaft within the vehicle body, and the lower end of the steering shaft projects downwardly and forwardly beyond the housing 219. A spade type flexible joint 231, similar to joint shown in Figs. 6 and 7, is provided on the lower end of the steering shaft. This joint, as previously described, includes a resilient rubber sleeve-like member which is adapted to dampen out vibrations and noise in the steering system. A stub shaft 233 of the joint 231 is connected with the upper or rear end of the flexible shaft 217 through a suitable key 235 and a sleeve-like clamp member 237, which is brazed or otherwise rigidly connected with the upper end of the flexible shaft 217. The lower end of the flexible shaft 217 is connected with the stub shaft portion 213 of the pinion gear 211 through a similar key and collar-like clamp arrangement 239. The flexible shaft 217 is of the type which will transfer torque without any substantial twisting in either direction so that when the steering wheel is turned, the steering shaft 215, the flexible shaft 217 and the pinion gear 211 will thus be rotated, causing lineal movement of the rack member 187 to cause movement of the valve spool 173 and thus direct the flow of fluid under pressure to opposite sides of the piston 156 in the cylinder 155 to aid in steering the vehicle in a manner previously described. The flexible shaft 217 while resisting twisting is capable of flexing in other directions so that the steering shaft 215 and pinion gear can be easily connected through flexible means and need not be in true lineal alignment. The flexible shaft may be of a suitable type having a core and wire-like windings around the core.

In this embodiment of the invention, it will be noted that there is no provision between the rack 187 and the cylinder 155 to prevent the cylinder from rotating about its longitudinal axis. Therefore, the arrangement illustrated in Figs. 12 and 13 is provided to prevent such rotation of the cylinder 155. This arrangement consists of a pair of links 241 and 243 which have their adjacent ends pivotally interconnected at 245. The opposite end of link 241 is pivotally connected at 247 to the cylinder connector element 159, while the opposite end of the link 243 is pivotally connected at 249 to the bracket 168 which is rigidly connected with the frame, and to which the free end of the piston rod 163 is flexibly connected. It will thus be appreciated that a scissors-type linkage is provided wherein the links are free to pivot about a generally vertical axis so that the cylinder 155 can move laterally of the chassis frame, but is prevented from rotating about its longitudinal axis by the linkage system connected between the cylinder and chassis frame. It will, of course, be appreciated that this linkage system could be used with various other types of power steering arrangements and is not necessarily confined to the specific arrangement with which it is disclosed.

In the embodiment of the invention illustrated in Figs. 17 and 18, a different arrangement for slidably supporting the inner end of the rack in the valve housing is illustrated, otherwise, the structure shown therein is substantially identical to that previously described. It will be seen that in this embodiment, the inner end portion 185' of the rack extends through the central bore in the valve spool 173' and is connected therewith, as in the previous embodiment, by means of snap rings 189'. Instead of the bushings 193 previously described, a ball-type bearing 253 slidably supports the inner end of the rack in the control valve housing 171' adjacent opposite ends of the valve spool. Each of the ball-type bearings 253 includes an outer race 255 and an inner race 257 having suitable apertures therein through which a portion of the balls 259 project and engage the inner end portion 185' of the rack so as to slidably support the same but give spaced bearings to prevent any detrimental deflection of the shaft or valve during vehicle operation.

It will thus be seen that with this embodiment of the invention, all of the advantages previously pointed out are retained and certain additional features are incorporated which may prove more advantageous or desirable in certain installations. It, likewise, will be appreciated that the flexible shaft arrangement illustrated in this embodiment is not limited to use with a particular power steering device which could be used with many steering devices or in steering arrangements wherein power steering is not necessarily included.

What is claimed is:

1. In a vehicle, a chassis frame, ground engaging wheels, means connecting said ground engaging wheels with said frame to permit said wheels to turn relative to said frame, a steering shaft actuatable by a steering wheel, steering links connected with said vehicle wheel connecting means, a cylinder adjacent said steering links, a bore-fitting piston within said cylinder, a piston rod connected to said piston and extending beyond one end of said cylinder, means connecting the free end of said piston rod to said chassis frame, means connecting said cylinder to said steering links so that movement of said cylinder will cause a turning movement of the ground engaging wheels in one direction or the other, a control valve including a lineally movable valve element, said valve element having a sufficient area of bearing engagement with the adjacent portion of said control valve so that binding between said valve element and said adjacent control valve portion will be precluded when said valve is subjected to operating loads imparted thereto during vehicle operation, a rack supported for movement on said chassis frame and rigidly connected with said movable valve element for actuating the latter, a gear rotatably supported on said frame and meshing with said rack so that rotation of said gear will cause lineal movement of said rack, means operatively connecting said gear with said steering shaft so that rotation of said shaft causes rotation of said gear, means connected with said cylinder and with said chassis frame restricting rotation of said cylinder, and conduit means communicating said control valve with said cylinder on opposite sides of said piston for directing fluid flow between a fluid pump and said cylinder to aid in steering the vehicle.

2. In combination, a vehicle including a chassis frame, ground engaging wheels, means connecting each wheel with said frame including a suspension arm, a steering knuckle carried by each suspension arm and connected with its adjacent wheel to permit said wheel to turn about a generally vertical axis, a steering knuckle arm connected with each steering knuckle, laterally extending rigid steering links connected with said steering knuckle arms and having their inner ends disposed in spaced apart relationship, a steering shaft actuatable by a steering wheel, a cylinder extending laterally of said vehicle adjacent said steering links, a bore-fitting piston within said cylinder, a piston rod connected with said piston and extending from one end of said cylinder, means flexibly connecting the free end of said piston rod to said chassis frame, connector means rigid with said cylinder and pivotally connected with said steering links so that movement of said cylinder laterally of the vehicle will cause a turning movement of the ground engaging wheels in one direction or the other, means connected between said chassis frame and said cylinder restricting rotation of said cylinder, a control valve disposed in a portion of said cylinder separated and remote from said piston and piston rod and including a valve body and a spool valve element lineally movable in said body, said valve element having a sufficient area of bearing engagement with said valve body so that binding between said valve element and said valve body will be precluded when said control valve is subjected to operating loads imparted thereto during vehicle operation, a rack member having one end thereof disposed within said control valve and rigidly connected with said valve element for movement longitudinally of said cylinder, said rack member projecting outwardly from said control valve, a support member connected with the chassis frame and slidably supporting said rack member, a gear meshing with said rack member and rotatably supported in said support member, flexible means connecting said gear with said steering shaft so that rotation of said steering shaft in either direction will cause longitudinal movement of said rack member in one direction or the other, and conduit means communicating said control valve with said cylinder on opposite sides of said piston for directing fluid flow between a fluid pump and said cylinder to aid in steering the vehicle.

3. In a vehicle, a chassis frame, ground engaging wheels, means connecting said ground engaging wheels with said frame to permit said wheels to turn relative to said frame, a steering shaft actuatable by a steering wheel, steering links connected with said vehicle wheel connecting means, a fluid motor having a cylinder, a bore-fitting piston in said cylinder and a piston rod connected with said piston and projecting exteriorly of said cylinder, means on said piston rod for flexibly connecting the free end thereof with said vehicle chassis frame, means on said cylinder connected with said steering links so that movement of said cylinder causes movement of said steering links, means connected with said cylinder and said chassis frame restricting rotation of said cylinder but permitting movement of said cylinder relative to said piston, a control valve including a body portion and a lineally movable valve element, said valve element having a sufficient area of bearing engagement with said control valve body portion so that binding between said valve element and said body portion will be precluded when said control valve is subjected to operating loads imparted thereto during vehicle operation, a rack rigidly connected with said movable valve element for moving the same, a support member connected with said chassis frame and movably supporting said rack, a gear journaled in said support member and meshing with said rack so that rotation of said gear will cause lineal movement of said rack, means connecting said gear with said steering shaft so that rotation of said steering shaft will cause rotation of said gear, and conduit means communicating said control valve with said fluid motor for directing fluid flow between a fluid pump and said fluid motor to aid in steering the vehicle.

4. In a vehicle power steering device, an elongated cylinder, means on said cylinder adapted to be connected with steering linkage of a vehicle, a bore-fitting piston disposed within said cylinder, a piston rod connected to said piston and projecting beyond one end of said cylinder, means carried by the projecting end of said rod for effecting a flexible connection with a portion of a vehicle, a control valve disposed in the opposite end of said cylinder and including a body portion and a lineally movable valve element, said valve element having a sufficient area of bearing engagement with said control valve body portion so that binding between said valve element and said body portion will be precluded when said control valve is subjected to operating loads imparted thereto during vehicle operation, means separating said control valve from the portion of said cylinder containing said piston, a rack rigidly connected with said movable valve element so that said valve element and said rack will move together as a unit, a support member movably supporting said rack and which is adapted to be connected with a vehicle chassis frame, a gear journaled in said support member and meshing with said rack, means for operatively connecting said gear with a vehicle steering shaft, means connected with said cylinder and connectible with a vehicle chassis frame for restricting rotation of said cylinder about its longitudinal axis but permitting axial movement of said cylinder, and conduit means communicating said control valve with said cylinder on opposite sides of said piston for directing fluid flow between a fluid pump and said cylinder to effect power steering for a vehicle.

5. A power steering device for vehicles, including a fluid motor having a cylinder, a bore-fitting piston in said cylinder and a piston rod connected with said piston and projecting exteriorly of said cylinder, means on the projecting end of said piston rod for connecting said rod with a vehicle chassis, means on said cylinder connectible to steering linkage of a vehicle, a control valve including a body portion and a lineally movable valve element, said valve element having a sufficient area of bearing engagement with said control valve body portion so that binding between said valve element and said body portion will be precluded when said control valve is subjected to operating loads imparted thereto during vehicle operation, a rack rigidly connected with said movable valve element so that said rack and valve element will move together as a unit, a support member connectible to a vehicle chassis and movably supporting said rack, a gear journaled in said support member and meshing with said rack, means for operatively connecting said gear with a vehicle steering shaft so that rotation of said gear will cause lineal movement of said rack, means connected with said cylinder and connectible with a vehicle chassis to restrict rotation of said cylinder about its longitudinal axis without interfering with longitudinal movement of said cylinder, and conduit means communicating said control valve with said fluid motor for directing fluid flow between a fluid pump and said fluid motor to provide power steering for a vehicle.

References Cited in the file of this patent

UNITED STATES PATENTS

| | | |
|---|---|---|
| 1,424,867 | Wolf | Aug. 8, 1922 |
| 1,529,178 | Greenwood | Mar. 10, 1925 |
| 1,532,509 | Mahood | Apr. 7, 1925 |
| 2,105,473 | Dean | Jan. 18, 1938 |
| 2,193,898 | Carter et al. | Mar. 19, 1940 |
| 2,272,900 | Saurer | Feb. 10, 1942 |
| 2,506,093 | MacDuff | May 2, 1950 |
| 2,676,663 | Smith | Apr. 27, 1954 |

FOREIGN PATENTS

| | | |
|---|---|---|
| 717,617 | France | Oct. 20, 1931 |
| 532,566 | Great Britain | Jan. 27, 1941 |
| 679,958 | Great Britain | Sept. 24, 1952 |
| 1,020,948 | France | Nov. 26, 1952 |
| 1,054,358 | France | Oct. 7, 1953 |
| 1,080,086 | France | May 26, 1954 |